United States Patent [19]
Jones

[11] 3,801,182
[45] Apr. 2, 1974

[54] OPTICAL SCANNING APPARATUS
[75] Inventor: Paul W. Jones, Billerica, Mass.
[73] Assignee: Identicon Corporation, Waltham, Mass.
[22] Filed: July 10, 1972
[21] Appl. No.: 270,203

[52] U.S. Cl................... 350/156, 250/225, 356/118
[51] Int. Cl. ........................................... G02b 27/28
[58] Field of Search.................... 350/147, 156, 159; 356/118; 250/225

[56] References Cited
UNITED STATES PATENTS
3,502,888   3/1970   Stites .............................. 356/118 X
3,415,589   12/1968  James .................................. 350/156
3,499,159   3/1970   Carrier et al. .................. 350/225 X
3,056,033   9/1962   Shepard ....................... 350/156 UX

*Primary Examiner*—John K. Corbin
*Attorney, Agent, or Firm*—Charles Hieken; Jerry Cohen

[57] ABSTRACT

A polarized light source illuminates a surface having portions of high and low specular reflectivity. A polarization filter transmits reflected light from the surface to a detector polarized orthogonally relative to the incident light from the polarized source.

4 Claims, 1 Drawing Figure

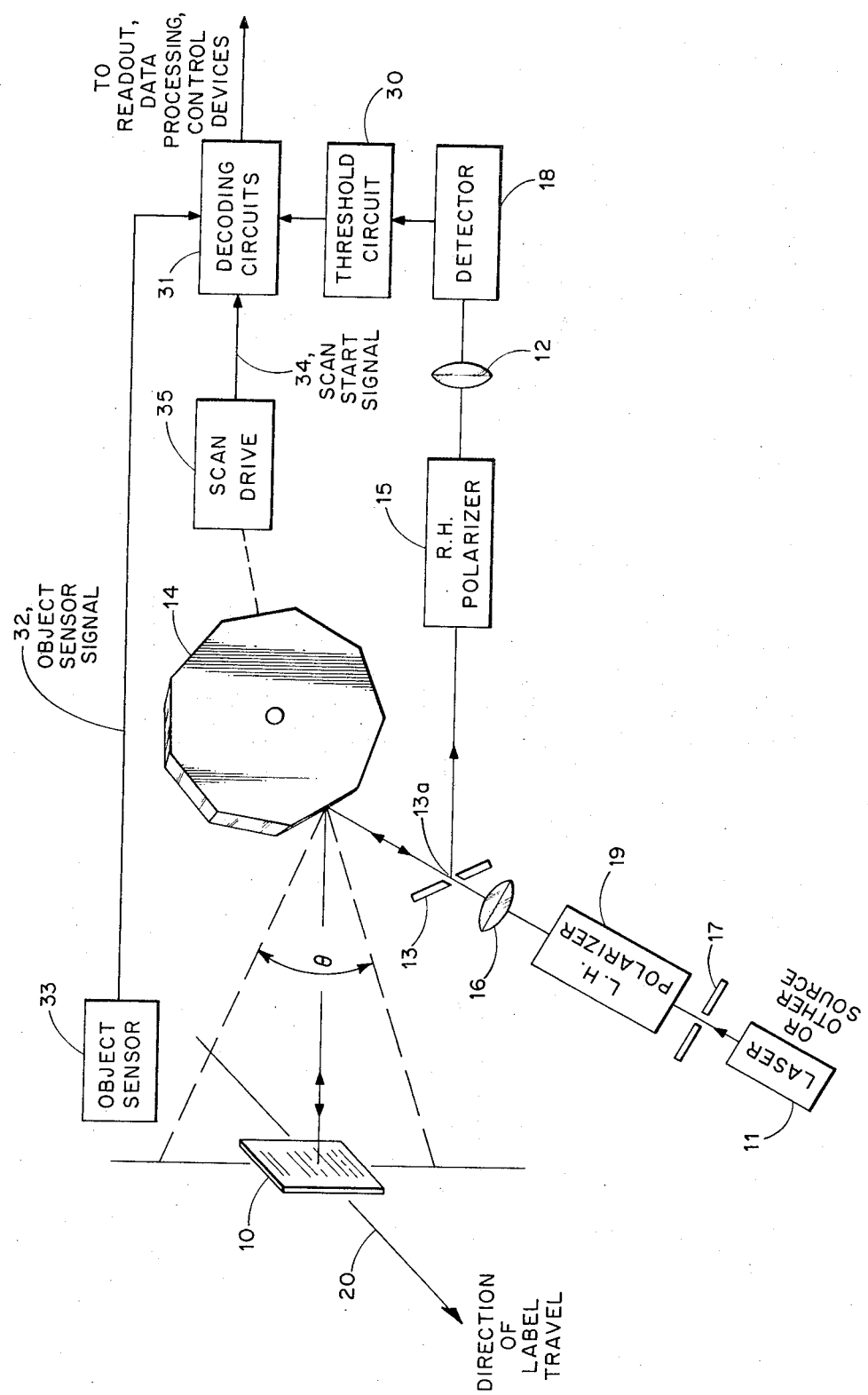

OPTICAL SCANNING APPARATUS

BACKGROUND OF THE INVENTION

The present invention relates in general to optical scanning and more particularly concerns novel apparatus and techniques for optically scanning ordinary surfaces having data encoded thereon by ordinary inks or paints.

Width-coded bars or intervals represent a convenient encoding technique for use with optical reading devices. Typically, a scanning system, such as the IDENTICON system commercially available from Identicon Corporation, Waltham, Massachusetts, comprises a photoelectric detector and scans the bar pattern to produce a train of pulses or pulse intervals of time duration corresponding to the pattern width variations and the scan velocity. Such a system encounters few difficulties when special high reflectance material is used to encode data. However, identifying labels incorporating such material are relatively expensive. While the IDENTICON system described above works satisfactorily in many applications with labels printed with ordinary ink on ordinary paper, there is a problem when the light illuminates the label at such an angle that the light reflected from the ink portions is almost of the same intensity as the light reflected from the blank portions.

Accordingly, it is an important object of the invention to provide apparatus and techniques for overcoming the problem outlined above.

It is another object of the invention to provide improved scanning apparatus.

It is another object of the invention to achieve one or more of the preceding objects while reliably reading data encoded on ordinary paper labels with ordinary ink.

It is another object of the invention to achieve one or more of the preceding objects with reliable apparatus that is relatively easy and inexpensive to fabricate and easy to adjust.

SUMMARY OF THE INVENTION

According to the invention there is a source of polarized radiant energy for illuminating a surface to be scanned, detecting means responsive to radiant energy reflected from the surface to be scanned, and polarization selective means for transmitting reflected energy from the surface to the detecting means of a predetermined polarization that is cross-polarized relative to the polarization of the incident radiant energy from the polarized source, and means for scanning the surface. Typically the radiant energy source can be a laser or any polarized source. The radiant energy source may provide linearly polarized radiant energy and the polarity selective means arranged to transmit light energy polarized orthogonal to the plane of the incident energy. Preferably, the incident radiant energy is circularly polarized of one rotational sense and the polarity selective means arranged to transmit radiant energy of the opposite rotational sense to the detecting means. Preferably, but not necessarily, the radiant energy is essentially monochromatic light such as provided by a laser to facilitate the selection process.

Numerous other features, objects and advantages of the invention will become apparent from the following specification when read in connection with the accompanying drawing.

BRIEF DESCRIPTION OF THE DRAWING

The single FIGURE of which shows a combined block-pictorial diagram illustrating the logical arrangement of a system according to the invention.

DETAILED DESCRIPTION OF PREFERRED EMBODIMENTS

With reference now to the drawing, there is shown a combined block-pictorial diagram illustrating the logical arrangement of a system according to the invention for scanning label 10 as it moves along a direction of label travel represented by arrow 20 generally parallel to the horizontal stripes on the label. Light from laser or other light source 11 is focused by lens system 16 through aperture 13a of apertured mirror 13 upon a multifaceted scanning mirror 14 after passing through aperture 17 and left hand circular polarizer 19. The rotation of scanning mirror 14 causes the circularly polarized light beam to scan repetitively through a vertical scan angle $\theta$. If an object bearing label 10 intersects this scan angle, scanning mirror 14 reflects light from the label for reflection by mirror 13. Lens system 12 then focuses this reflected light upon photodetector 18 after passing through right hand polarizer 15. The polarizers and laser or other light source represent the structural differences between the present invention and the aforesaid Identicon system. For completeness, the rest of the system in the drawing will not be described.

Photodetector 18 converts the incident light energy into electrical signals which are converted into pulses by threshold circuit 30 with durations proportional to the width of the label bars. The decoding circuits 31 convert the resulting pulse rate to useful information in response to an object sensor signal provided on line 32, indicating that an object is in position to be scanned provided by object sensor 33, and a scan start signal on line 34 provided by scan drive 35, indicating that the start of a scan has just commenced. Details of these elements in the block diagram are part of the prior art at least as represented by the aforesaid commercially available Identicon system.

The present invention solves the problem which occurred when an object bearing an ink-printed label is examined by a prior art system. The mirror-like finish of most inks and paints may reflect incident light nearly as well as the rest of the label surface to make it difficult or impossible to distinguish the different widths. The problem will be better appreciated if one holds up a magazine to a bright light. At certain angles of the page surface relative to the direction to the light source, bright reflections occur from the ink which make it difficult to read the print.

The invention overcomes the problem in the following manner. The mirror-like finish of the ink or paint reflects incident light with substantially the same polarization. However, the nonspecular surface of the label that does not bear ink or paint diffuses the incident light so that light reflected from this surface is largely of Lambertian or random polarization. Since polarizer 19 is cross-polarized relative to the energy provided through polarizer 15, the specularly reflected component from the ink or painted surfaces is substantially rejected. While this is the preferred method of discriminating, the principles of the invention could also be applicable in a system where polarizers 15 and 19 were of the same sense to accept only the specularly reflected component from the ink or painted surfaces provided that more light incident upon the surface was reflected from the inked or painted surfaces than from the nonspecular reflecting surfaces. It is also possible to use linearly polarized energy in which polarizers 15 and 19 would be cross-polarized.

There has been described the best mode now contemplated for practicing the invention. It is within the principles of the invention to use other techniques. For example, light source 11 could be another radiant energy source. Various forms of polarizers could be used, for example, Polaroid Corporation HN38, or HN40 or a "GLAN Thompson" polarizer, or calcite crystals, and other polarizers. Other scanning techniques may be employed, for example, the light source could be a flying spot electronically or mechanically provided. A suitable light source is a Spectra Physics Model 132 laser.

There has been described a novel system that facilitates using inexpensive ink or painted encoding labels in automatic moving object identification systems while overcoming the serious problem of being unable to distinguish between mark and space intervals caused by specular reflection from the inked or painted surfaces. It is evident that those skilled in the art may now make numerous other modifications and uses of and departures from the specific embodiments described herein without departing from the inventive concepts. Consequently, the invention is to be construed as embracing each and every novel feature and novel combination of features present in or possessed by teh apparatus and techniques herein disclosed.

What is claimed is:

1. Scanning apparatus for reading encoded labels having a surface of spaced specular reflecting portions painted or inked on nonspecular reflecting portions comprising, a source of radiant energy polarized in a first sense, means for scanning said surface with said polarized radiant energy, means responsive to the energy reflected from said surface for selectively transmitting energy cross-polarized with respect to said first sense polarization, and means for detecting only the latter transmitted radiant energy.

2. Apparatus in accordance with claim 1 wherein said radiant energy is incident from a substantially monochromatic source.

3. Apparatus in accordance with claim 1 wherein said means for scanning comprises a multifaceted rotating reflecting means exchanging light energy through means including a mirror formed with a slit, said first polarizer being interposed between said slit and said light source whereby light from said light source passes through said first polarizer and said slit to said reflecting means, said second polarizer being interposed between said mirror and said means for detecting whereby light from said reflecting means is transmitted through said second polarizer to said means for detecting after reflection from said mirror.

4. Apparatus in accordance with claim 3 wherein said light source is a laser.

* * * * *